United States Patent [19]
Ishii et al.

[11] Patent Number: 5,560,447
[45] Date of Patent: Oct. 1, 1996

[54] DRIVE TRANSMISSION FOR WORKING VEHICLES

[75] Inventors: Norihiro Ishii; Shigenori Sakikawa, both of Itami, Japan

[73] Assignee: Kanzaki Kokyukoki Mfg. Co., Ltd., Amagasaki, Japan

[21] Appl. No.: 457,035

[22] Filed: Jun. 1, 1995

[30] Foreign Application Priority Data

Jul. 25, 1994 [JP] Japan .................. 6-193519

[51] Int. Cl.$^6$ ............................... B60K 17/356
[52] U.S. Cl. .............. 180/242; 180/307; 60/490
[58] Field of Search .................. 180/242, 243, 180/247, 305, 307; 60/490, 491

[56] References Cited

U.S. PATENT DOCUMENTS

| | | | |
|---|---|---|---|
| 4,579,183 | 4/1986 | Irikura et al. | 180/53.1 |
| 5,078,659 | 1/1992 | Von Kaler et al. | 60/491 X |
| 5,177,964 | 1/1993 | Tanaka et al. | 60/490 X |
| 5,188,193 | 2/1993 | Schroeder | 180/242 |
| 5,207,060 | 5/1993 | Sheets | 180/242 X |

FOREIGN PATENT DOCUMENTS

| | | | |
|---|---|---|---|
| 1945438 | 3/1971 | Germany | 180/242 |
| 3-73751 | 7/1991 | Japan . | |

*Primary Examiner*—Kevin T. Hurley

[57] ABSTRACT

A vehicle drive transmission includes a hydrostatic transmission (14) which comprises a hydraulic motor (16) of a variable displacement type. Swash plate (29) of this motor is displaced from its neutral position in one direction in a stepwise manner to plural angular positions. The motor is used for setting one of plural speed ranges or low-speed and high-speed ranges of vehicle within which vehicle speed can be changed in a non-stepwise manner by a hydraulic pump (15) having a non-stepwisely displaceable swash plate (28). Output shaft (18) driven by the motor is connected to rear wheels (2) for a constant drive thereof through a mechanical transmission mechanism (21) and to front wheels (1) for a selective drive thereof through a clutch mechanism (26; 126; 226). The clutch mechanism preferably includes a one-way clutch (85) for providing a selective drive mode in which front wheels are additionally driven automatically when slipping of the rear wheels is caused during the two wheel-drive condition.

13 Claims, 10 Drawing Sheets

DRIVE TRANSMISSION FOR WORKING VEHICLES

FIELD OF THE INVENTION

This invention relates to a drive transmission for use in working vehicles such as tractors. More particularly, the present invention relates to a vehicle drive transmission which comprises a hydrostatic transmission for changing the traveling speed of vehicle in a non-stepwise manner. In particular, the present invention relates to a vehicle drive transmission which is suitable for propelling a vehicle by driving four wheels.

BACKGROUND OF THE INVENTION

A hydrostatic transmission employed in a working vehicle is generally composed of a hydraulic pump of a variable displacement type and a hydraulic motor of a fixed displacement type for the purpose of avoiding complication not only in structure but in speed-changing operations. A four wheel-drive transmission for working vehicles is usually adapted to drive a pair of primary vehicle-drive wheels (rear wheels or front wheels) constantly while permitting a selective drive of a pair of auxiliary vehicle-drive wheels (front wheels or rear wheels).

A four wheel-drive transmission, including a hydrostatic transmission, of the type set forth above which is considered to be of the simplest structure is such, as disclosed in JP, U No. 3-73751, in that a hydrostatic transmission adapted to drive rear wheels constantly through a rear wheel-drive assembly is provided and in that there is arranged at a front side of the hydrostatic transmission a front wheel-drive assembly which comprises a front wheel-drive shaft for taking-off front wheel-driving power and a front wheel-driving clutch for selectively connecting the drive shaft to a front end of the output shaft of the hydrostatic transmission. However, this structure cannot be employed in a drive transmission in which the rear wheel-drive assembly includes a speed change mechanism for setting a low-speed range, required when the vehicle is used in working operations, and a high-speed range required when the vehicle is traveled on roads. This is because, while the peripheral speed of rear wheels is changed in response to a shifting operation of the speed change mechanism, the peripheral speed of front wheels driven to rotate through the front wheel-drive shaft remains unchanged, so that a condition may be caused where there is much difference in peripheral speed between front wheels and rear wheels.

Thus, in a transmission in which the rear wheel-drive assembly includes a speed change mechanism for changing or setting vehicle speed ranges, a front wheel-drive shaft is provided which is connected to a transmission shaft of the driven side of the speed change mechanism as shown, for example, in U.S. Pat. No. 4,579,183. However, such a structure will cause problems that transmission casing for housing the speed change mechanism is enlarged in size and that the hydrostatic transmission arranged at a front side of the transmission casing provides a restriction to the arrangement of a transmission shaft for transmitting power from the front wheel-drive shaft toward the front wheels so that the transmission shaft cannot be arranged at an appropriate level or in a laterally central location.

Accordingly, a primary object of the present invention is to provide a novel vehicle drive transmission in which vehicle speed ranges can be set by a hydrostatic transmission itself so as to eliminate a speed change mechanism of the type set forth above and to thereby permit an easy employment of a four wheel-drive structure.

An attendant object of the invention is to provide a transmission in which speed-changing operations are simplified while reducing the cost of the transmission largely.

In view of the fact that a working vehicle such as a tractor is used for various working operations and in view of the fact that such a vehicle is generally traveled at a relatively high speed when it is traveled on a road, it is another object of the present invention to provide a novel transmission which provides plural drive modes for the vehicle.

An attendant object of the invention is to provide a four wheel-drive structure which permits an easy conversion to a two wheel-drive structure so as to contribute to reducing the cost of these drive structures.

Another attendant object is to provide a four wheel-drive transmission which contributes to reducing fuel cost while stabilizing the traveling condition of vehicle.

SUMMARY OF THE INVENTION

The present invention relates to a drive transmission for working vehicles which includes a hydrostatic transmission. According to the present invention, the hydrostatic transmission comprises: an input shaft which is adapted to be driven by an engine; a variable displacement pump driven by the input shaft and having a first swash plate which is adapted to be angularly displaced from its neutral position in one and the other directions in a non-stepwise manner; a variable displacement motor being in fluid-connection with the pump so as to be driven by the pump and having a second swash plate which is adapted to be angularly displaced from its neutral position in one direction in a stepwise manner to plural angular positions; and an output shaft which is driven by the motor and is connected drivingly to vehicle-drive wheels.

The transmission including such a hydrostatic transmission can be fashioned into a four wheel-drive transmission by, for example, connecting the output shaft to primary vehicle-drive wheels (rear wheels or front wheels) through a mechanical transmission mechanism so as to drive the primary drive wheels constantly and by connecting the output shaft to auxiliary vehicle-drive wheels (front wheels or rear wheels) through a clutch which permits a selective drive of the auxiliary drive wheels.

The variable displacement motor which has the second or motor swash plate set forth above permits a selective setting of one of the plural displacements corresponding to the plural angular positions of the swash plate so that the motor permits the vehicle speed to be changed in plural stages. Consequently, setting of one of the plural different speed ranges within which the vehicle is to be traveled in accordance with its traveling conditions can be made by the motor. Non-stepwise control of the vehicle traveling speed including the reversing of traveling direction can be attained by varying the angular positions of the first or pump swash plate in a non-stepwise manner. Consequently, the output shaft of the hydrostatic transmission is given a rotational speed which can be varied in a non-stepwise manner by the pump swash plate within the speed range selected by the motor swash plate, so that any difference in peripheral speed between the front wheels and the rear wheels is not caused even in a four wheel-drive structure.

Because the motor swash plate, which is displaced in a stepwise manner to the plural angular positions, can be retained at each of its neutral and plural angular positions with certainty by providing in its operating structure a position-retaining mechanism which is operable to retain the swash plate releaseably at each of the neutral position and plural angular positions, this swash plate can be operated much more easily as compared to a motor swash plate which is varied in its angular position in a non=stepwise manner. Any errors cannot be expected in controlling the angular positions of such a motor swash plate. When this swash plate is placed in its neutral position, power transmission line through the hydrostatic transmission is interrupted by the motor. As a result of this, a fluid pressure-unloading valve which will be detailed hereinafter can be omitted. In a vehicle transmission assembly including a hydrostatic transmission, a fluid pressure-unloading valve which can be used for unloading high fluid pressure in the hydrostatic transmission is usually provided preparing for the case where the vehicle requires traction by another vehicle because of possible incapability of engine-start due to a lowered battery capacity or the like. This is because, when the vehicle is traveled by being drawn by another vehicle, the hydraulic motor of hydrostatic transmission is driven reversely from the side of the vehicle-drive wheels so that the motor acts as a hydraulic pump to generate a high fluid pressure which is confined in one of a pair of connecting fluid passages between the pump and motor of the hydrostatic transmission so as to resist against the traction of vehicle. The unloading valve, which may be designed, for example, such that it is operable to unload fluid pressure in one of the connecting passages set forth above to the other connecting passage so as to eliminate resistance against the vehicle traction, is thus usually provided. In the transmission according to the present, the motor does not act as a pump at the neutral position of its swash plate even when the motor is driven reversely. It is thus seen that a pressure-unloading valve of the function set forth above is not required.

According to the present invention which enables to change vehicle speed ranges in a stepwise manner by the motor, a speed change mechanism for changing or setting vehicle speed ranges employed in the transmission according to the prior art is eliminated. Further, the motor swash plate having a neutral position permits the omission of a fluid pressure-unloading valve as detailed above. Consequently, cost of the transmission according to the present invention is kept low notwithstanding the employment of a variable displacement motor.

The pump swash plate is preferably of a trunnion type which has at its one and the other sides a pair of support shafts, while the motor swash plate is preferably of a cradle type which is rockably supported by a stationary guide member. The pump swash plate of a trunnion type can be operated with a light operating force owing to a pair of support shafts of both sides and can be controlled precisely so that it is suitable as the one which is operated frequently during the travel of vehicle for controlling the traveling speed of vehicle precisely. The motor swash plate of a cradle type is simple in structure and is easy in processing and in assembling.

For the purpose of simplifying the structure of control mechanism for the hydrostatic transmission, a single maneuvering member or change lever is preferably provided which is operable to angularly displace the pump swash plate when it is operated to move along one direction while to angularly displace the motor swash plate when it is operated to move along another direction. Preferably, such a maneuvering member or change lever can be guided by a guide member which permits a displacement of the pump swash plate from its neutral position only at each of the plural angular positions of the motor swash plate. By such a guide member, a safe start of the vehicle is assured because the motor is necessarily operated first so as to set one of the speed ranges of vehicle and then the pump swash plate is operated so as to start the vehicle.

The present invention further relates to a four wheel-drive transmission for working vehicles which comprises:

a hydrostatic transmission including an input shaft, a hydraulic pump driven by the input shaft and having a first swash plate which is adapted to be angularly displaced from its neutral position in one and the other directions in a non-stepwise manner, a hydraulic motor being in fluid-connection with the hydraulic pump so as to be driven by the pump and having a second swash plate which is adapted to be angularly displaced from its neutral position in one direction in a stepwise manner to plural angular positions, and an output shaft driven by the hydraulic motor;

a mechanical transmission mechanism which connects the output shaft of the hydrostatic transmission at its one end to a first pair of vehicle-drive wheels such that the first pair of drive wheels are driven constantly; and a clutch mechanism which connects the output shaft of the hydrostatic transmission at the other end thereof to a second pair of vehicle-drive wheels so as to permit a selective drive of the second pair of drive wheels.

The first pair of drive wheels which may be either a pair of rear wheels or a pair of front wheels constitute a pair of primary vehicle-drive wheels, whereas the second pair of drive wheels which may be either a pair of front wheels or a pair of rear wheels constitute a pair of auxiliary vehicle-drive wheels.

The four wheel-drive transmission of this structure also has the advantages set forth above that the second or motor swash plate can be operated easily without errors in operation, that a fluid pressure-unloading valve can be omitted, and that a speed change mechanism for changing or setting speed ranges of the vehicle can also be omitted. Of course, there is caused no difference in peripheral speed between the first pair of drive wheels and the second pair of drive wheels. Because the second pair of drive wheels are driven by the output shaft of the hydrostatic transmission through the clutch mechanism set forth above, vehicle drive modes can be changed by means of the clutch mechanism as will be detailed hereinafter.

A working vehicle of a four wheel-drive type is generally traveled at a low speed during a working operation and at a high speed when traveled on a road. Further, the vehicle is generally traveled by two wheel drive so as to save fuel cost when it is used for a light-load working operation such as a mowing operation or when it is traveled on a road, whereas the vehicle is generally traveled by four wheel drive so as to highten tractive force when it is used for a heavy-load working operation such as a working operation using a tiller, trailor or loader associated with the vehicle. Two wheel drive during a light-load working operation also contributes to reducing the radius of turn of the vehicle so that damage given to the ground during a vehicle turn is reduced. In a case where a clutch mechanism, which can be shifted selectively to a condition of constantly driving the second pair of drive wheels and to another condition of cutting-off driving of these wheels (non-drive condition), is employed as the clutch mechanism set forth above, all of the traveling modes of vehicle set forth above can be realized. This is because at least one low-speed range and at least one high-speed range can be set by controlling the angular positions of the motor swash plate and because switching between the two wheel drive mode and the four wheel drive mode can be attained by means of the clutch mechanism. The clutch mechanism shiftable to the two conditions set forth above can be fashioned such that it is shifted to the non-drive condition of the second pair of drive wheels in response to the operation of the motor swash plate to its high-speed range angular position. By this, the two wheel drive condition which serves to save fuel cost is automatically attained at the high-speed range afforded by the motor.

The clutch mechanism for controlling the driving of the second pair of drive wheels or auxiliary drive wheels can also be fashioned such that it provides, other than a constant drive mode for the auxiliary drive wheels, a selective drive mode which will be detailed hereinafter. According to an embodiment of the present invention, the clutch mechanism includes, other than a movable clutch member for selectively connecting the auxiliary drive wheels drivenly to the output shaft of the hydrostatic transmission, a one-way clutch which is engaged automatically so as to connect the auxiliary drive wheels drivenly to the output shaft at a position of the movable clutch member where the auxiliary drive wheels are disconnected from the output shaft and at a time when the one-way clutch is relatively driven forward-directionally by the output shaft. This one-way clutch will provide a selective drive mode of driving the auxiliary drive wheels at a particular condition. More specifically, even in the two wheel drive condition where the auxiliary drive wheels are disconnected from the output shaft so that the vehicle is driven to travel only by the first pair of drive wheels or primary drive wheels, rotation is transmitted to the driven side of the clutch mechanism from the auxiliary drive wheels which rotate with the travel of vehicle. In this condition, the rotational speed of the driven side of the clutch mechanism is normally equal to that of the output shaft of the hydrostatic transmission so that the one-way clutch is kept disengaged. However, when the primary drive wheels are in a slipping condition which may be caused when these wheels fall into a pit or while the vehicle is climbing up a slope or is turned, the vehicle speed is lowered so that the rotational speed of the auxiliary drive wheels and, therefore, that of the driven side of the clutch mechanism are lowered. When this is the case, the one-way clutch is relatively driven forward-directionally from the side of the output shaft and is automatically engaged. Consequently, the one-way clutch transmits the rotation of the output shaft to the auxiliary drive wheels so that a four wheel drive condition is automatically attained whereby the slipping condition of the primary drive wheels is eliminated promptly. It is thus seen that the selective drive mode afforded by the one-way clutch will provide, when a slipping condition of the primary drive wheels is caused during the two wheel drive condition of vehicle which serves to save fuel cost, a four wheel drive condition automatically so as to attain a stable traveling condition of vehicle.

The clutch mechanism can also be fashioned such that is provides three drive modes for the auxiliary drive wheels: a constant drive mode, a selective drive mode and a non-drive mode. According to another embodiment of the present invention, the clutch mechanism includes a wheel-drive shaft which is co-rotatably connected to the second pair of drive wheels or auxiliary drive wheels; an intermediate shaft which is disposed rotatably between the output shaft of hydrostatic transmission and the wheel-drive shaft; a movable clutch member which is adapted to be moved to a first position where the drive shaft is coupled to the output shaft, a second position where the drive shaft is coupled to the intermediate shaft, and a third position where the drive shaft is disconnected from both of the output shaft and intermediate shaft; and a one-way clutch which is similar to the one set forth above but is disposed between the output shaft and the intermediate shaft. Because the drive shaft is co-rotatable with the intermediate shaft at the second position of the movable clutch member, the one-way clutch affords a selective drive mode, in which it is automatically engaged so as to provide a four wheel drive condition, when a slipping condition of the primary drive wheels is caused under the two wheel drive condition of vehicle.

In the four wheel drive transmission in which the primary vehicle-drive wheels are constantly driven by the output shaft of hydrostatic transmission through the mechanical transmission mechanism set forth before and in which the auxiliary vehicle-drive wheels are selectively driven by the output shaft through the clutch mechanism set forth before, it is preferred that the mechanism transmission mechanism is housed within a transmission casing in which wheel axles of the primary drive wheels are journalled and that the hydraulic motor of hydrostatic transmission and the clutch mechanism are housed within a housing which is mounted on the transmission casing at an outer surface of this casing located on the side of the auxiliary drive wheels. According to this structure, a transmission shaft for taking-off driving power for the auxiliary drive wheels can be arranged at an appropriate level without being deviated laterally in a direction across the vehicle. Further, a vehicle drive transmission having a hydraulic motor of a fixed displacement type as the motor of a hydrostatic transmission can be provided only by exchanging the motor so that cost of these two kinds of transmissions is reduced. In addition, both of the hydraulic motor and clutch mechanism can be lubricated with lubricant contained within the housing set forth above.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
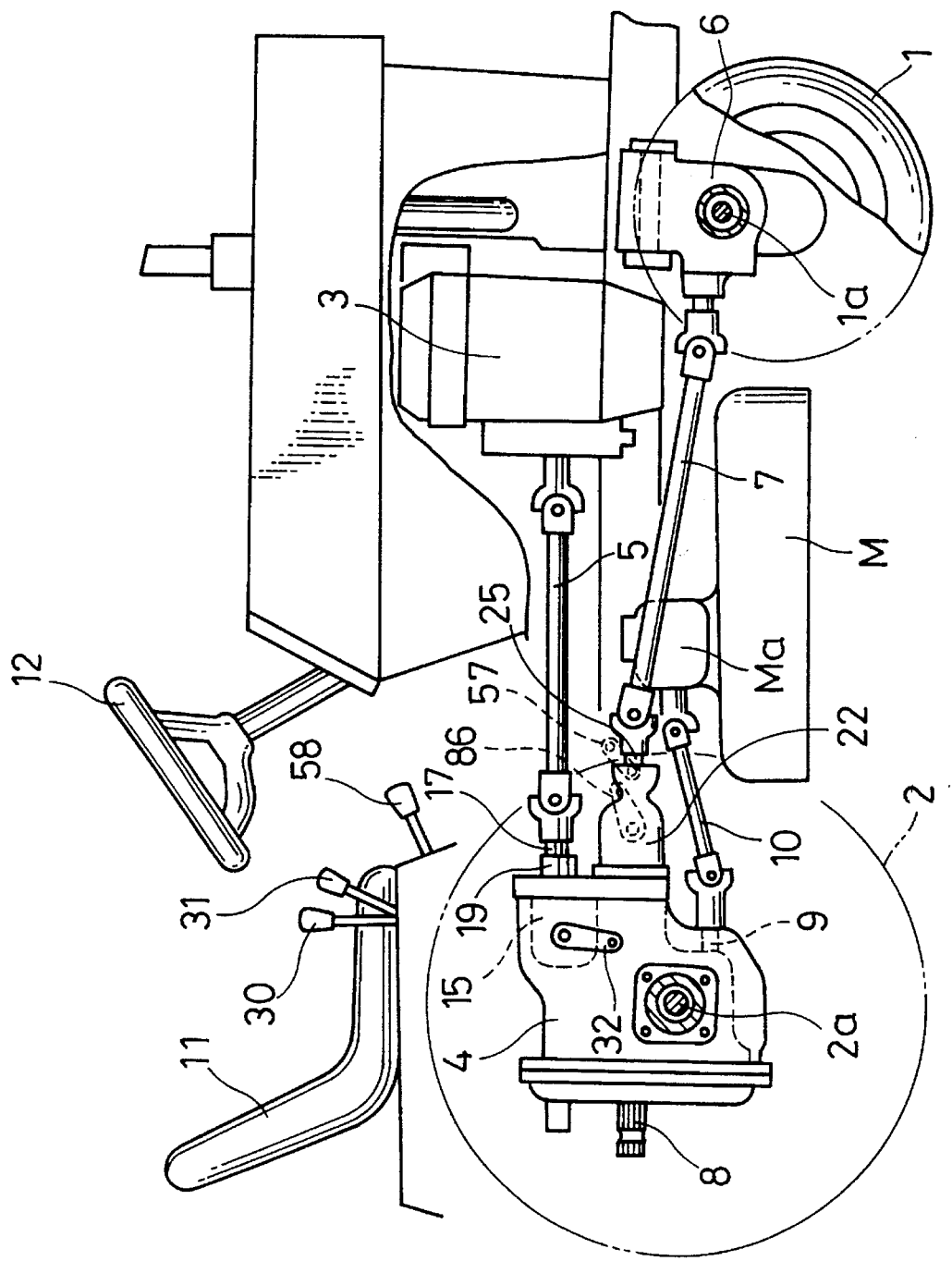
FIG. 1 is a schematic side view, partially cut away and partially in section, of a mower tractor in which a first preferred embodiment of the drive transmission according to the present invention is employed.

FIG. 1 shows a mower tractor in which a first preferred embodiment of the vehicle drive transmission according to the present invention is employed. The tractor shown is adapted to be equipped with a mid-mount mower M on the underside of the vehicle between pairs of left and right front wheels 1 and rear wheels 2. The left and right rear wheels 2 shown are employed as a pair of primary vehicle-drive wheels which are constantly driven to rotate for traveling the vehicle, whereas the left and right front wheels 1 are employed as a pair of auxiliary vehicle-drive wheels which are driven to rotate selectively when it is required or wanted. However, in a working vehicle such as a tractor equipped with a front-mount mower, it is preferred to drive front wheels constantly. In such a vehicle, the arrangement of transmission shown is preferably reversed so that front wheels are employed as constantly driven primary drive wheels while permitting a selective drive of rear wheels.

As shown in FIG. 1, engine 3 as a drive source is mounted on a front portion of the vehicle. Between the left and right rear wheels 2, a transmission casing 4 is disposed which supports wheel axles 2a of the left and right rear wheels 2. Power of engine 3 is transmitted into the transmission casing 4 through a transmission shaft 5 which extends axially of the vehicle. The vehicle is traveled by transmitting driving power to the left and right rear wheel axles 2a at an inside of the transmission casing 4 and, as the occasion demands, by transmitting driving power to left and right front wheel axles 1a at an inside of a front-axle casing 6. A transmission shaft 7 is provided for transmitting power from a front side of the transmission casing 4 into the front-axle casing 6.

As also shown in FIG. 1, a rear-PTO shaft 8 extends rearwardly from the transmission casing 4 at a mid level of this casing and a mid-PTO shaft 9 extends forwardly from the transmission casing 1 at a low level of this casing. The rear-PTO shaft 8 is used for driving an auxiliary implement (not shown), such as a rotary tiller or grass collector, which is drawn by the vehicle. The mid-PTO shaft 9 is adapted to transmit mower-driving power into a gear box Ma of the mower M through a transmission shaft 10. Seat 11 is arranged above the transmission casing 4, and a steering wheel 12 which is used for providing steering turns to the left and right front wheels 1 is located before the seat 10.

Figure 2:
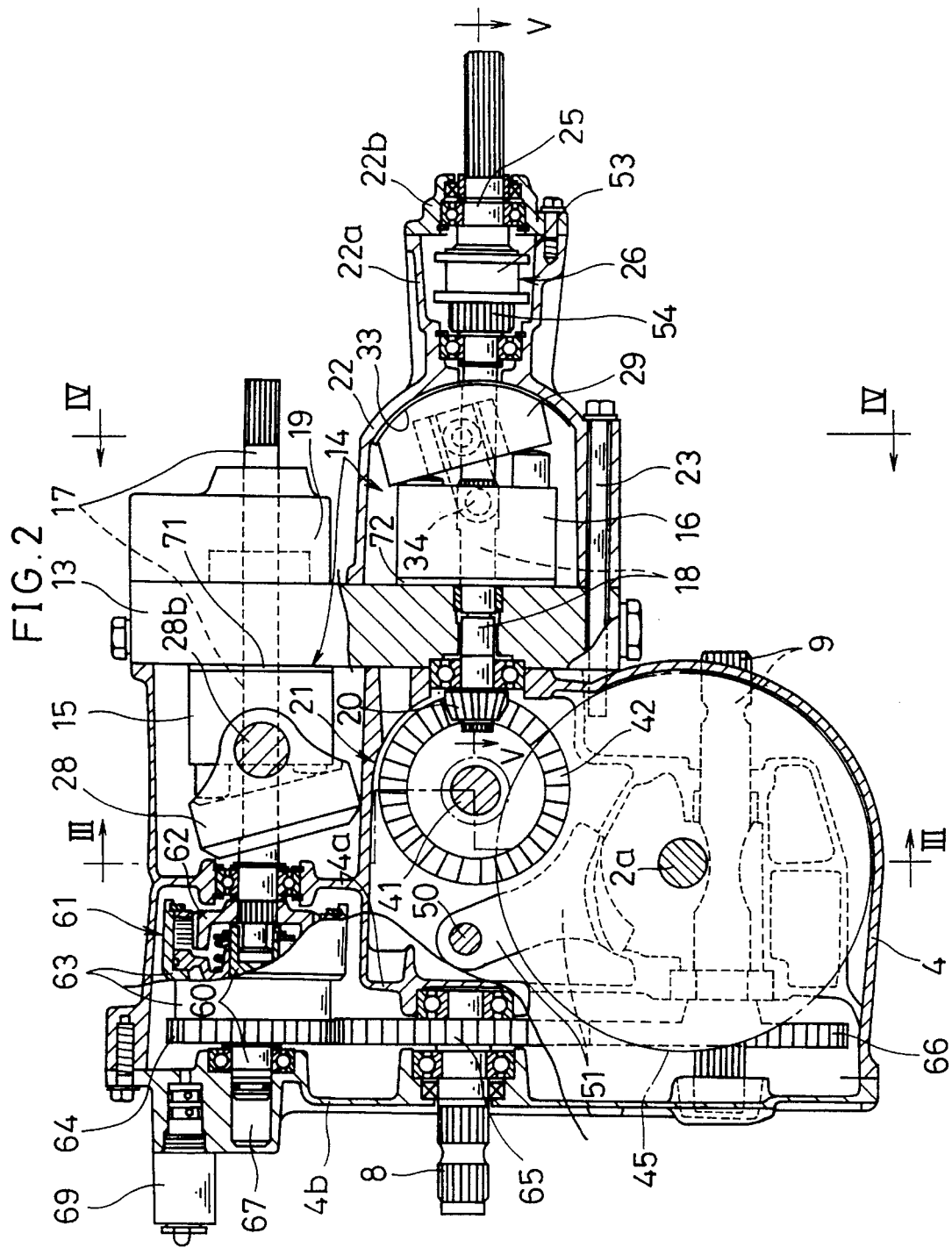
FIG. 2 is a sectional side view, partial developed, showing the transmission employed in the tractor shown in FIG. 1.

As shown in FIG. 2, a plate member 13 having a relatively large thickness is secured to the front of the transmission casing 4. A hydrostatic transmission 14 is provided, and it comprises a hydraulic pump 15 of a variable displacement type, which is mounted on the rear surface of an upper half of the plate member 13 and is located within the transmission casing 4, and a hydraulic motor 16 of a variable displacement type which is mounted on the front surface of a lower half of the plate member 13 and is located outside the transmission casing 4. This hydrostatic transmission 14 has an input shaft 17, which is employed also as the pump shaft of the hydraulic pump 15, and an output shaft 18 which is employed also as the motor shaft of the hydraulic motor 16. The input shaft 17 extends forwardly of the plate member 13 and is connected to the transmission shaft 5 shown in FIG. 1. A fluid pump 19 for which input shaft 17 is employed as its pump shaft is mounted on the front surface of the plate member 13. The pump 19 is used for supplementing operating fluid to the hydrostatic transmission 14. The input shaft 17 extends also backwardly of the hydraulic pump 15 and is used also for driving PTO shafts 8 and 9, as will be detailed later.

As also shown in FIG. 2, the output shaft 18 of the hydrostatic transmission 14 extends backwardly through the plate member 13 into the transmission casing 1 and carries at its rear end a small bevel gear 20. Within the transmission casing 1 and below the hydraulic pump 15, a mechanical transmission mechanism 21 is disposed such that it is operable to transmit rear wheel-driving power from the bevel gear 20 to the left and right rear wheel axles 2a. The hydraulic motor 16 is housed within a housing 22 which is secured to the front surface of the plate member 13 suing bolts 23. The output shaft 18 extends also forwardly of the hydraulic pump 16 into a clutch casing 22a which is formed integral with the housing 22 and located in front of this housing. The clutch casing 22a includes a front end cover 22b and supports a rotatable front wheel-drive shaft 25 which is disposed co-axially with the output shaft 18. A front wheel-driving clutch 26 is disposed within the casing 22a for selectively connecting the drive shaft 25 to the output shaft 18. Drive shaft 25 extends forwardly of the end cover 22b and is connected to the transmission shaft 7 shown in FIG. 1.

As also shown in FIG. 2, each of the hydraulic pump 15 and hydraulic motor 16 is of an axial plunger type and includes an angularly displaceable swash plate 28 or 29. Angular positions of these swash plates 28 and 29 are controlled respectively using a pump control lever 30 and motor control lever 31 which are arranged, as shown in FIG. 1, at one side of the seat 11.

Figure 3:
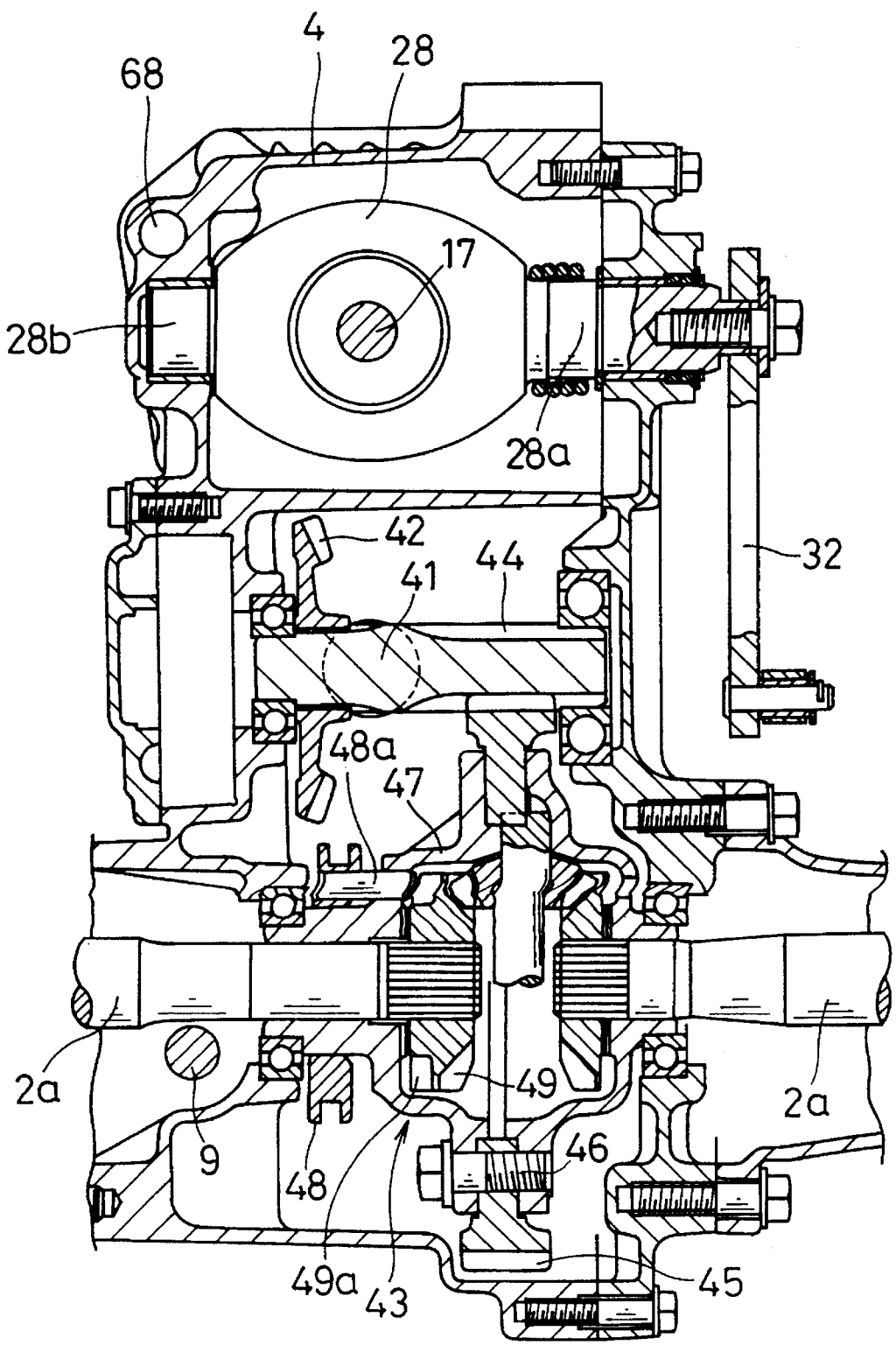
FIG. 3 is a sectional view taken generally along line III—III of FIG. 2.
Figure 4:
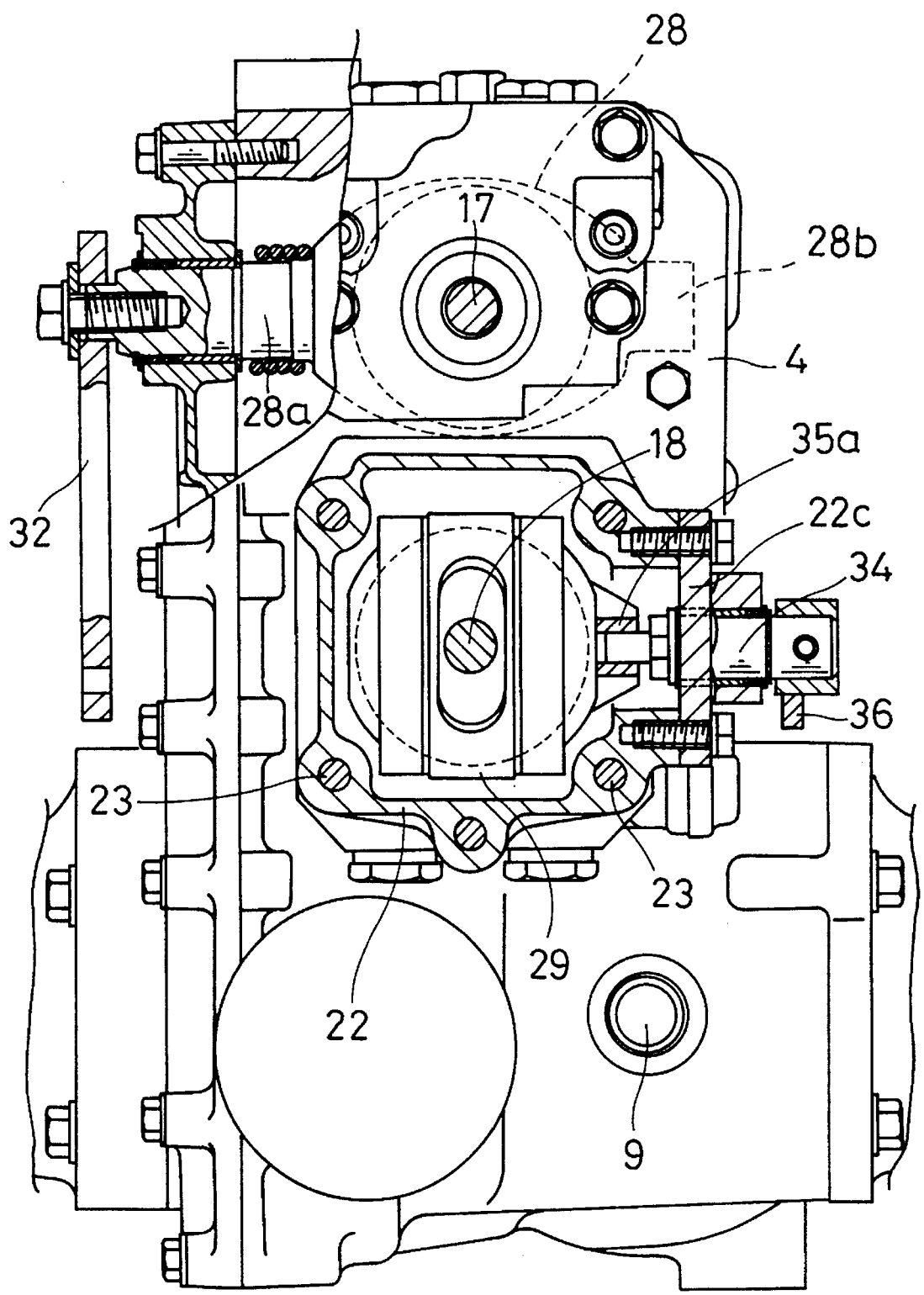
FIG. 4 is a sectional view taken generally along line IV—IV of FIG. 2.

As shown in FIGS. 2 to 4, the pump swash plate 28 is of a trunnion type having a pair of left and right support shafts 28a and 28b which are supported rotatably by left and right side walls of the casing 1. One of the support shafts 28a extends outwardly of the transmission casing 1 and has an arm 32 attached thereto. The arm 32 is connected to the pump control lever 30 shown in FIG. 1 through a control cable or link mechanism (not shown) such that the pump swash plate 2 is operated by means of lever 30 so as to be angularly displaced from a neutral position, where pumping action of the hydraulic pump 15 is interrupted, in one and the other directions in a non-stepwise manner so as to change the flow direction of fluid discharged from the pump and to vary the flow quantity of this fluid in a non-stepwise manner.

Figure 5:
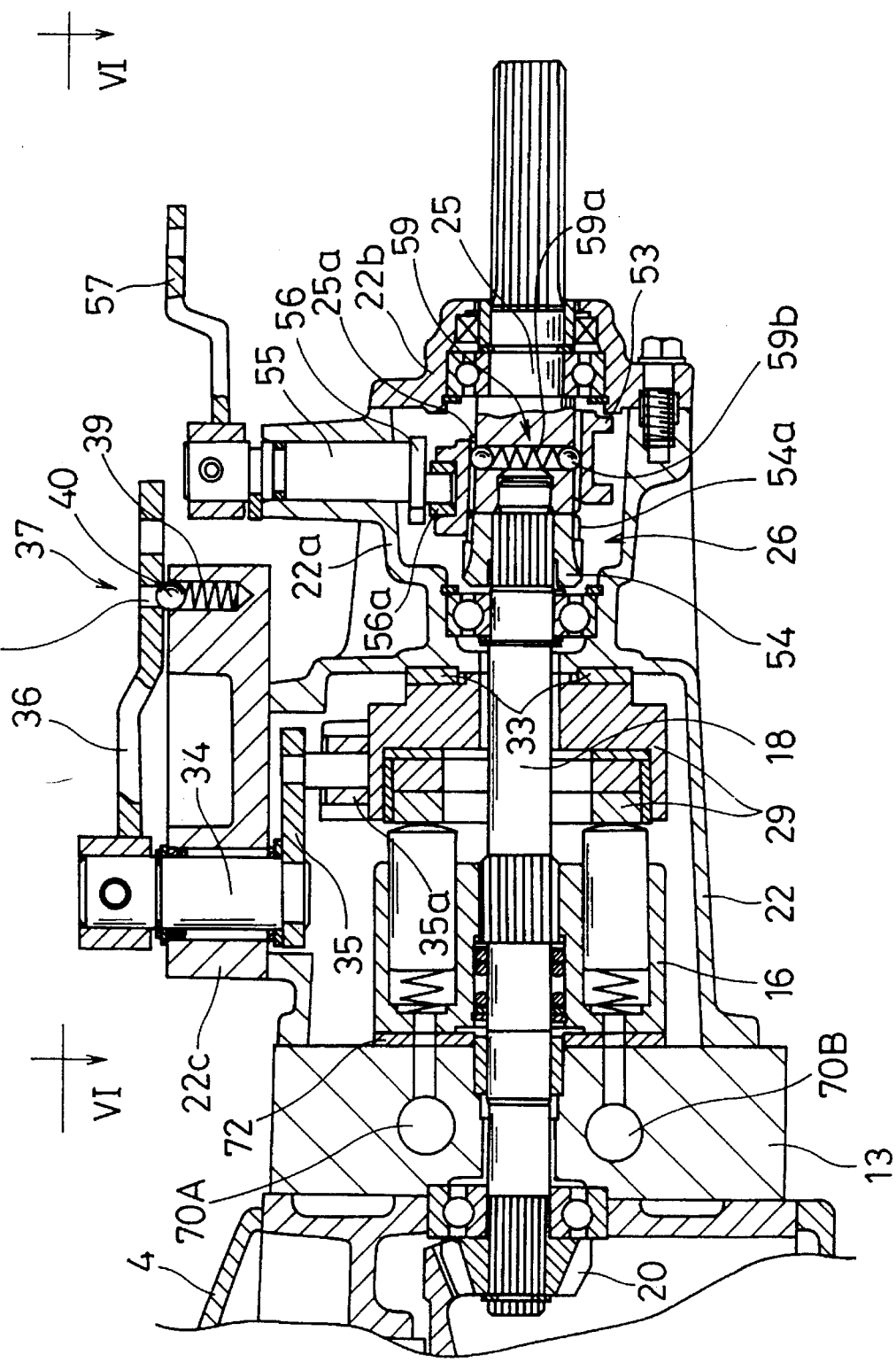
FIG. 5 is an enlarged sectional view taken generally along line V—V of FIG. 2.
Figure 6:
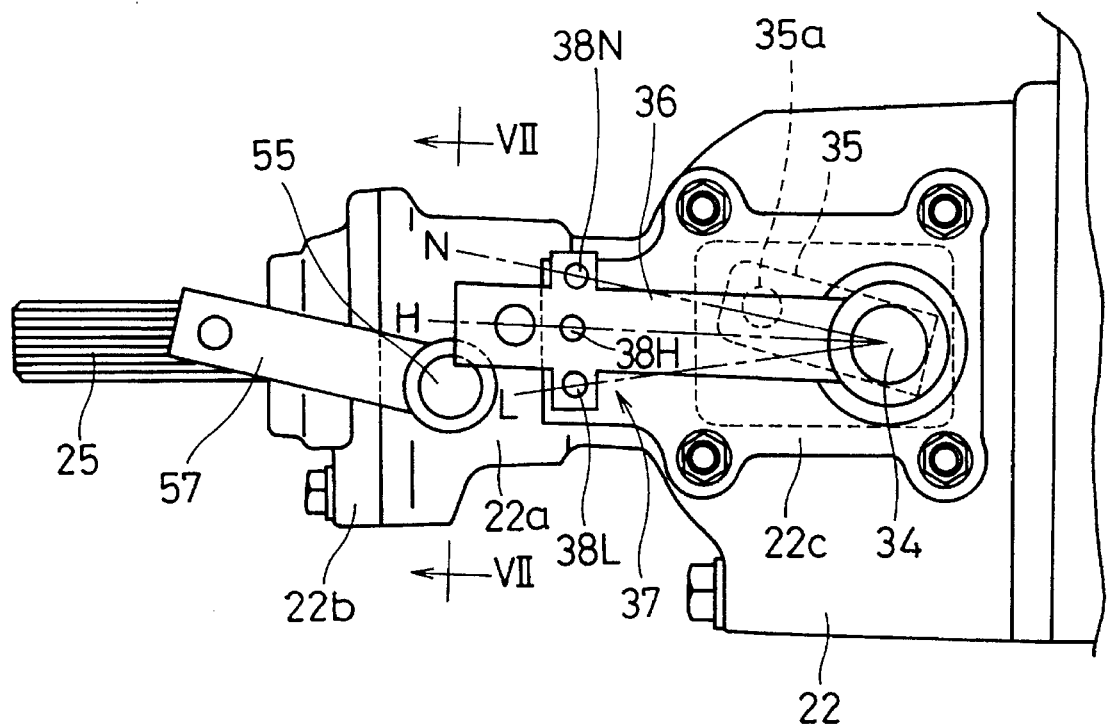
FIG. 6 is a side view seen along arrows VI—VI of FIG. 5.

As shown in FIG. 2 and in FIGS. 4 to 6, the motor swash plate 29 is of a cradle type which is guided by an arc-shaped guide plate 33. The plate 33 is secured to the inner front surface of the housing 22. Housing 22 includes in a side wall thereof an opening, which is closed with a side cover 22c, through which a rotatable control shaft 34 extends. This control shaft 34 carries at its inner end an arm 35 having a shifter 35a which engages swash plate 29 such that when arm 35 is rockingly displaced by a rotational displacement of the control shaft 34, the motor swash plate 29 is angularly displaced. The control shaft 34 carries at its outer end another arm 36 which is connected to the motor control lever 31 shown in FIG. 1 through a control cable or link mechanism (not shown). The motor swash plate 29 is adapted such that it is displaced by means of motor control lever 31 from its neutral position, where the hydraulic motor 16 is kept in its neutral or non-driven condition, only in one direction and only to first and second angular positions where the displacement of pump 16 is adjusted to first and second values. As shown in FIGS. 5 and 6, a retaining mechanism 37 is disposed between the arm 36 and side cover 22c. This retaining mechanism 37 comprises three holes 38N, 38H and 38L in the arm 36 and a ball 40 which is received in a bore in the outer surface of the side cover 22c and is biased by a spring 39 to project outwardly of the side cover. Three angular positions N, H and L of the arm 36 shown in FIG. 6 correspond respectively to neutral, high-speed and low-speed positions of the swash plate 29. The arm 36 and, therefore, swash plate 29 are restrained releaseably at each of these positions by the ball 40 projecting into the corresponding hole 38N, 38H or 38L. Consequently, the motor swash plate 29 is angularly displaced from its neutral position N selectively to a high-speed position H, where the hydraulic motor 16 is driven at a high speed, and to a low-speed position L where the hydraulic motor 16 is driven at a low speed.

The mechanical transmission mechanism 21, which is disposed within the transmission casing 4, will be detailed hereinafter by referring to FIGS. 2 and 3. This transmission mechanism 21 includes a drive shaft 41 which extends laterally of the transmission casing 4 at the level same as that of the output shaft 18. A larger bevel gear 42 is fixedly mounted on this drive shaft 41 and meshes with the bevel gear 20 on the output shaft 18. A differential gearing 43 is disposed between left and right rear wheel axles 2a, and a small gear 44 integral with the drive shaft 41 meshes with a larger input gear 45 of the differential gearing 43. Differential casing of the gearing 43 is composed of left and right casing halves which are fastened together with the input gear 45 sandwiched therebetween using bolts 46. A differential lock clutch 48 is slidably mounted on the boss portion of one of the casing halves 47. This lock clutch 48 has locking pins 48a which extend through a side wall of the casing half 47 such that these pins 48a may project into recesses 49b in the boss portion of a differential side gear 49 of one side and lock the gear 49 non-rotatably to the differential casing and to thereby disable the differential gearing 43. The lock clutch 48 is operated by a fork member 51 which is supported by a guide shaft 50. The guide shaft 50 extends laterally at a location behind the drive shaft 41.

Figure 7:
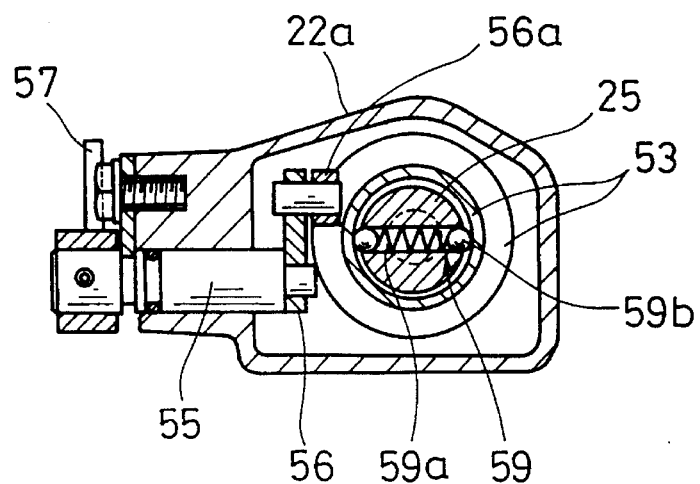
FIG. 7 is a sectional view taken along line VII—VII of FIG. 6.

The front wheel-driving clutch 26 will be detailed hereinafter by referring to FIGS. 5 and 7. This clutch 26 includes a movable clutch member 53 which is slidably but non-rotatably mounted on the front wheel-drive shaft 25 using splines 25a in the outer surface of shaft 25. A tubular member 54 is fixedly mounted on a front end portion of the output shaft 18 and includes in its outer surface splines 54a which are aligned with splines 25a in the drive shaft 25. The clutch member 53 is adapted to be moved selectively to a clutch-in position, shown in FIG. 5 with respect to an upper half thereof, where it engages both of the splines 54a and 53a and couples the drive shaft 25 to the output shaft 18, and to a clutch-off position, shown in FIG. 5 with respect to a lower half of this member 53, where it engages only splines 53a and disconnects the drive shaft 25 from the output shaft 18. For operating the movable clutch member 53, a rotatable control shaft 55 extends through a side wall of the clutch casing 22a and carries, at its inner end, an arm 56 having a shifter 56a which engages the clutch member 53. The control shaft 55 carries, at its outer end, another arm 57 which is operatively connected to a font wheel-drive lever 58, arranged before the seat 11 as shown in FIG. 1, through a control cable or link mechanism (not shown). A latching mechanism 59 which comprises a spring 59a and a pair of balls 59b is disposed between the drive shaft 25 and clutch member 53 for latching the clutch member at the clutch-in position and at the clutch-off position, respectively.

Drive mechanism for the PTO shafts 8 and 9 will be described. As shown in FIG. 2, the output shaft 17 of hydrostatic transmission 14 extends backwardly of the hydraulic pump 15 and has its rear end at a location behind an internal partition wall 4a of the transmission casing 4. A transmission shaft 60 is disposed co-axially with and behind the input shaft 17 and is supported by a rear end portion of shaft 17 and by a rear end cover 4b of the transmission casing. A fluid-operated PTO-clutch 61 of a multi-disc type is disposed between these shafts 17 and 60. The PTO-clutch 61 comprises first and second sets of frictional elements supported slidably but non-rotatably by an annular support member 62, which is fixedly mounted on a rear end portion of the input shaft 17, and by a clutch cylinder 63 which is fixedly mounted on the transmission shaft 60. A gear 64 is formed integral with the clutch cylinder 63. The rear-PTO shaft 8 is supported by the partition wall 4a and by the rear end cover 4b, and this PTO shaft 8 has on it a gear 65 which meshes with the gear 64. The mid-PTO shaft 9 is supported at its rear end by the rear end cover 4b, and this PTO shaft 9 has on it a gear 66 which meshes with the gear 65. The fluid pump 19 is operable to supply working fluid also to the PTO-clutch 61, and a fluid chamber 67 is defined within the rear end cover 4b at a location behind the transmission shaft 60. Fluid is supplied from the pump 19 to the fluid chamber 67 through a fluid passage 68 formed in a wall of the transmission casing 4, as shown in FIG. 3, and through an electromagnetic control valve 69 mounted on an outer surface on the rear end cover 4b, and then to the PTO-clutch 61 through a fluid passage (not shown) in the transmission shaft 60. For enabling to drive rear- and mid-PTO shafts 8 and 9 independently of each other, the gears 65 and 66 may satisfactorily be mounted rotatably on the PTO-shafts such that these gears can be coupled to the respective shafts 8 and 9 by a mechanical rear-PTO clutch (not shown), which is disposed on the rear-PTO shaft 8, and by a mechanical mid-PTO clutch (not shown) which is disposed on the mid-PTO shaft 9.

The plate member 13 includes in it fluid passage, parts of which are shown in FIG. 5 and are designated by numerals 70A and 70B, for connecting between the hydraulic pump 15 and hydraulic motor 16 and also various valves (not shown) which are associated with the hydrostatic transmission 14. In FIGS. 2 and 5, numerals 71 and 72 designate respectively valve plates which are interposed between the plate member 13 and the cylinder block of hydraulic pump 15 and between the plate member 13 and the cylinder block of hydraulic motor 16.

In use of the transmission of the first embodiment having been detailed hereinbefore, the motor swash plate 29 is displaced using the motor control lever 31 shown in FIG. 1 to the low-speed position L or to the high-position H and is retained in that position by means of position-retaining mechanism 37 shown in FIGS. 5 and 6. Under this condition, the vehicle can be traveled forwards or backwards at a non-stepwisely variable speed by angularly displacing the pump swash plate 28 from its neutral position in one or the other direction in a non-stepwise manner using the pump control lever 30 shown in FIG. 1. By operating the front wheel-driving clutch 26 shown in FIGS. 2 and 5 using the front wheel-drive lever 58 shown in FIG. 1, there can be optionally selected a four-wheel drive mode, in which both of the front and rear wheels 1 and 2 are driven, or a two-wheel drive mode in which only the rear wheels 2 are driven.

When various works are carried out using the tractor shown in FIG. 1, the motor swash plate 29 is normally placed at its low-speed position L. When a light-load work such as a mowing operation using the mower M is carried out, the two-wheel drive mode is generally selected. In a heavy-load work with a trailer, loader or the like associated with the tractor, the four-wheel drive mode is generally selected so as to obtain a large tractive force. When the rear wheels 2 under the two-wheel drive condition are in a slipping condition which may be caused when the rear wheels fall into a pit or while the vehicle is climbing up a slope or is turned, the front wheel-driving clutch 26 is engaged using the front wheel-drive lever 58 so as to obtain the four-wheel drive condition and to thereby eliminate such a slipping condition promptly. When the vehicle is traveled on a road so that no substantial tractive force is required, the motor swash plate 29 is generally placed in its high-speed position H and the front wheel-driving clutch 26 is generally kept in its disengaged condition.

When the vehicle requires traction thereof by another vehicle because of incapability of engine-start due to a lowered capacity of battery or the like, the motor swash plate 29 is placed in its neutral position. In this case, even when the output shaft 18 of hydrostatic transmission 14 is forcedly driven from the side of rear wheels 2 or from the side of front and rear wheels 1 and 2, the hydraulic motor 16 will not perform a pumping action so that a resistance against travel of the vehicle due to confinement of fluid pressure between the hydraulic pump 15 and motor 16 is never caused.

Figure 8:
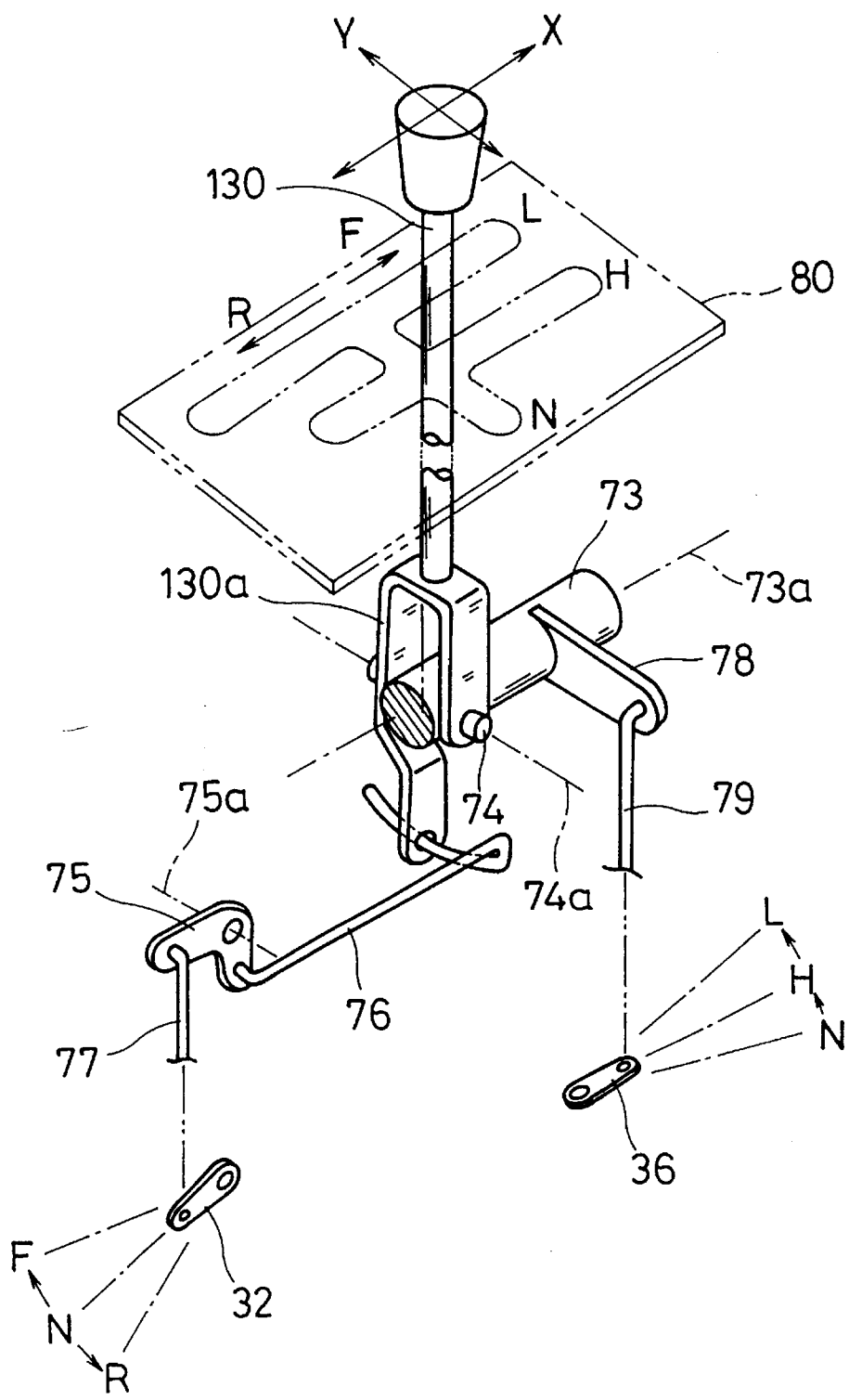
FIG. 8 is a schematic perspective view showing a modification of a part of the first embodiment.

FIG. 8 illustrates a modification of the first embodiment in which the pump control lever 30 and motor control lever 31 shown in FIG. 1 are replaced by a single change lever 130. In this modification, the single change lever 130 is supported at its lower end forked portion 130a by a control shaft 73, which is supported rotatably about its own axis 73a, through a pin 74 such that the lever 130 is rotatable about the pin 74. The pin 74 has its axis 74a which is perpendicular to the axis 73a of the control shaft 73. One leg of the forked portion 130a is connected, through a rod member 76, to one arm of a bell crank 75 which is supported rotatably about an axis 75a. The other arm of bell crank 75 is connected to a pump swash plate-control arm 32, which corresponds to the arm 32 shown in FIGS. 3 to 5, through a rod member 77 such that, when change lever 130 is operated from its neutral position rotationally about the pin 74, along arrow X shown, in one and the other directions, the pump-control arm 32 is displaced rotationally from its neutral position in one and the other directions so that is displaces the pump swash plate 28 (not shown in FIG. 8) angularly from the neutral position N forward-directionally (F) and backward-directionally (R). An arm 78 extends perpendicularly from the control shaft 73. This arm 78 is connected to a motor swash plate-control arm 36, which corresponds to the arm 36 shown in FIGS. 5 and 6, through a rod member 79 such that when the change lever 130 is operated rotationally about shaft 73, along arrow Y shown, so that the shaft 73 is rotated about its axis 73a, the motor-control arm 36 is displaced rotationally from its neutral position in one direction. By this rotational displacement of the arm 36, the motor swash plate 29 (not shown in FIG. 8) is angularly displaced from its neutral position N to the high-speed position H and then to the low-speed position L.

A lever guide 80 for guiding the change lever 130 is provided, and it includes a guide groove which extends along arrow Y for guiding the lever such that it can be operated at the neutral position N of arm 32 so as to displace the arm 36 from its neutral position N to the high-speed position H and then to the low-speed position L. The lever guide 80 further includes another two guide grooves which extend from the former guide groove perpendicularly along arrow X for guiding the lever such that it can be operated at the high-speed position H of arm 36 and at the low-speed position of arm 36 so as to displace the arm 32 from its neutral position N forward-directionally (F) and backward-directionally (R).

According to the modification shown in FIG. 8, the pump swash plate (28) is necessarily kept in its neutral position N at the neutral position N of the motor swash plate (29) and, using a single lever 130, only after the motor swash plate (29) has been displaced to its high-speed position H or low-speed position L while the pump swash plate (28) is kept at its neutral position N, the pump swash plate (28) can be displaced forward-directionally or backward-directionally. Consequently, the motor swash plate is necessarily operated first for setting a high-speed range or a low-speed range under a stopped condition of the vehicle and then the pump swash plate is operated so as to start the vehicle forward-directionally or backward-directionally. This will assure a safe start of the vehicle. As shown in FIG. 8, the guide groove along arrow X at the high-speed position H is much shorter in the backward-directional side than in the forward-directional side so that a dangerous state of traveling vehicle backwardly at a high speed can be avoided by the lever guide 80.

Figure 9:
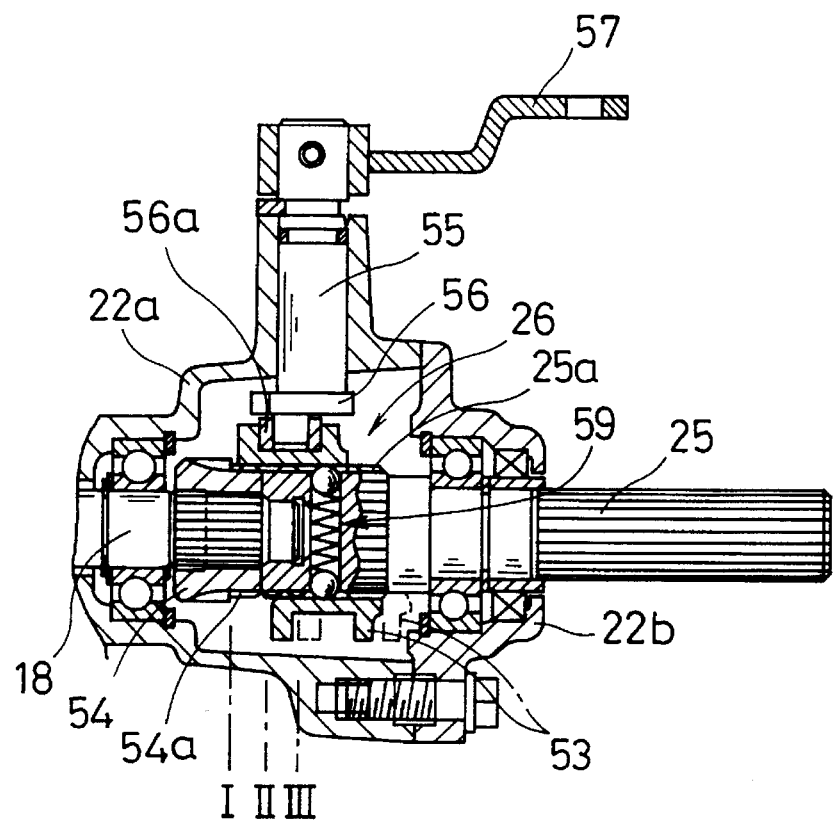
FIG. 9 is a sectional side view showing another modification of a part of the first embodiment.
Figure 10:
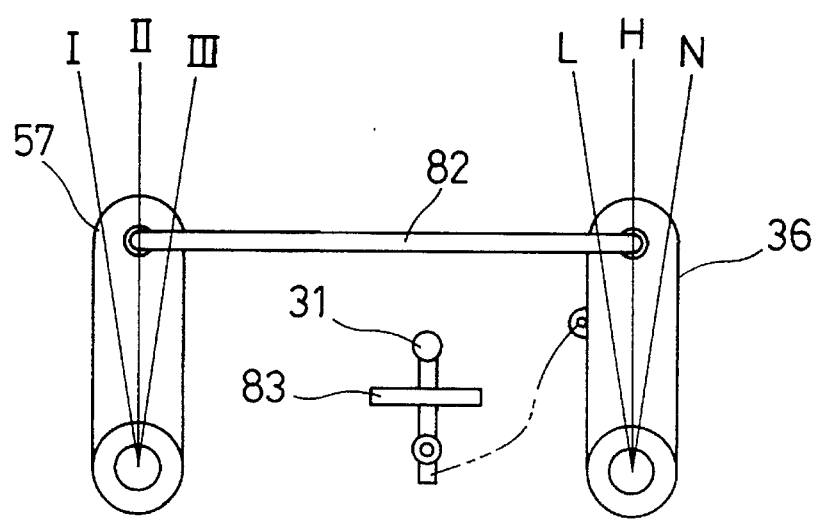
FIG. 10 is a schematic view showing a control mechanism employed in the modification shown in FIG. 9.

In FIGS. 9 and 10, there is shown another modification of the first embodiment in which the front wheel-driving clutch 26 is controlled in response to the control of motor swash plate. As shown in FIG. 9, the front wheel-driving clutch 26 itself is identical with the one employed in the first embodiment. This clutch 26 includes, however, a movable clutch member 53 which is shifted to a clutch-in position shown in FIG. 9 with respect to an upper half thereof, a first clutch-off position shown in FIG. 9 with respect to a lower half of the clutch member 53, and a second clutch-off position shown in phantom in FIG. 9 with respect to the lower half of the clutch member. In FIG. 9, these clutch-in position, first clutch-off position and second clutch-off position are shown respectively by positions I, II and III which depict the rear end positions of the movable clutch member 53. The latching mechanism 59 shown is identical with the one employed in the fist embodiment but is adapted to latch the clutch member 53 releaseably at such three positions I, II and III.

As shown in FIG. 10, motor swash plate-control arm 36 and clutch-control arm 57 which are identical respectively with the corresponding ones employed in the first embodiment are connected with each other through a rod member 82 such that, when the arm 36 is placed, using the motor-control lever 31, to the neutral position N, high-speed position H and low-speed position L, respectively, the clutch-control arm 57 and, therefore, clutch member 53 are placed to the clutch-in position I, first clutch-off position II and second clutch-off position III, respectively. The control arm 36 is operated by means of motor control lever 31 which is guided by a lever guide 83, and clutch-operating means which corresponds to the front wheel-drive lever 58 set forth before is not provided. According to the modification shown in FIGS. 9 and 10, the front wheel-driving clutch 26 takes conditions shown in the following TABLE 1 in response to the positions of motor swash plate.

TABLE 1

| Motor Swash Plate (29) | Front Wheel-Driving Clutch (26) |
|---|---|
| Neutral Position N | Second Clutch-off Condition |
| High-Speed Position H | First Clutch-off Condition (Two-Wheel Drive Mode) |
| Low-Speed Position L | Clutch-in Condition (Four-Wheel Drive Mode) |

The modification shown in FIGS. 9 and 10 is suitable for use in a working vehicle which is used for relatively heavy-load works. It is possible to combine the modification shown in FIG. 8 and the one shown in FIGS. 9 and 10 such that not only the pump swash plate and motor swash plate but the front wheel-driving clutch are operated by means of a single change lever.

Figure 11:
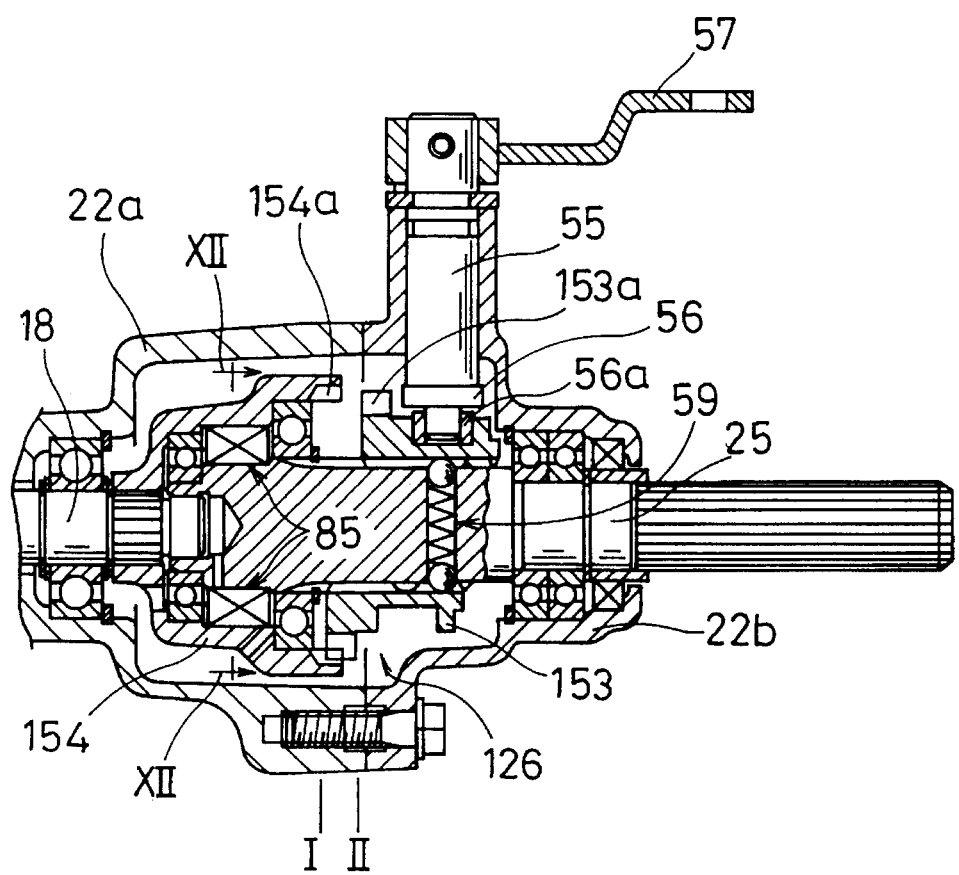
FIG. 11 is a sectional side view of a part of a second preferred embodiment of the transmission according to the present invention.
Figure 12:
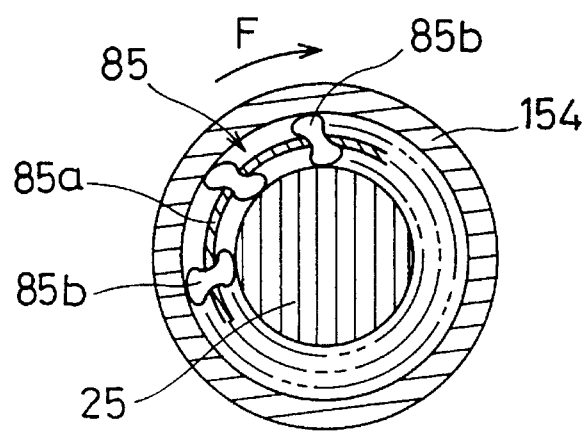
FIG. 12 is an enlarged sectional view taken along line XII—XII of FIG. 11.

Referring to FIGS. 11 and 12, there is shown a second embodiment in which a front wheel-driving clutch mechanism 126 is provided which includes a one-way clutch. As shown in FIG. 11, a hollow shaft 154 is fixedly mounted on a front end portion of the output shaft 18 of hydrostatic transmission such that it extends forwardly around a front wheel-drive shaft 25. The hollow shaft 154 includes, at its front end portion, internal teeth 154a. A movable clutch member 153 is slidably but non-rotatably mounted on the drive shaft 25 using a spline-fitting. This clutch member 153 has, at its front end portion, external teeth 153a which are engageable with the teeth 154a. The clutch member 153 is adapted to be shifted to a clutch-in position I, shown in FIG. 11 with respect to a lower half thereof, where teeth 153a are engaged with the teeth 154a, and to a clutch-off position II, shown in FIG. 11 with respect to an upper half of the member 153, where teeth 153a are disengaged from the teeth 154a. A latching mechanism 59 similar to the one set forth before is provided, and it is operable to latch the movable clutch member 153 releaseably at each of these positions I and II.

As shown in FIGS. 11 and 12, a one-way clutch 85 is disposed between the hollow shaft 154 and the drive shaft 25. As shown in FIG. 12, this one-way clutch 85 comprises a plurality of engaging members 85b which are supported at the inclined postures shown by a retainer ring 85a disposed between the hollow shaft 154 and the drive shaft 25 such that, when the forward-directional rotation of the hollow shaft 154 shown with arrow F is larger in speed than that of the drive shaft 25, the one-way clutch 85 is engaged automatically to thereby transmit rotation from the hollow shaft 154 to the drive shaft 25.

Consequently, the front wheel-driving clutch 126 will provide at its clutch-in condition, where the teeth 154a and 153a are mutually engaged, a constant drive mode for the front wheels in which the rotation of the output shaft 18 and hollow shaft 154 is transmitted constantly to the drive shaft 25, whereas the clutch 126 will provide at its clutch-off conditions, where the teeth 153a are disengaged from the teeth 154a, a selective drive mode for the front wheels in which the rotation of the output shaft 18 and hollow shaft 154 is transmitted selectively to the drive shaft 25 through the one-way clutch 85 only when the rotational speed of the output shaft 18 and hollow shaft 154 is larger than that of the drive shaft 25. While the vehicle is running forwards under the selective drive mode which is preselected by selecting the position of the movable clutch member 153, the front wheel-drive shaft 25 is driven to rotate from the side of the front wheels, which are rotated with the forward-directional travel of vehicle by the two-drive of rear wheels, at a rotational speed equal to that of the output shaft 18 and hollow shaft 154 so that one-way clutch 85 is usually kept disengaged.

The constant drive mode is generally selected when a heavy-load work with a trailor, loader or the like associated with the vehicle is carried out. The selective drive mode is generally selected when a light-load work such as a mowing operation using mower M shown FIG. 1 is carried out or when the vehicle is traveled on a road. When the rear wheels under the selective drive mode for the front wheels are in a slipping condition which may be caused when the rear wheels fall into a pit or while the vehicle is climbing up a slope or is turned, the traveling speed of vehicle becomes lowered as compared to the rotational speed of the rear wheels so that the rotational speed of the front wheels and, therefore, that of the front wheel-drive shaft 25 are lowered. In this case, the one-way clutch 85 is driven relatively by the output shaft 18 forward-directionally so that this clutch 85 is engaged automatically. Consequently, power is transmitted from output shaft 18 to the drive shaft 25 so that the front wheels are forcedly driven to rotate. Thus, the slipping condition of the rear wheels is eliminated promptly so that a stable traveling condition of the vehicle is attained. In other words, the second embodiment shown in FIGS. 11 and 12 will attain, when a slipping condition of the rear wheels is caused during a travel of the vehicle under the two-wheel drive condition, a four-wheel drive condition automatically without the need of operating the front wheel-driving clutch so as to secure a stable traveling condition of the vehicle.

Figure 13:
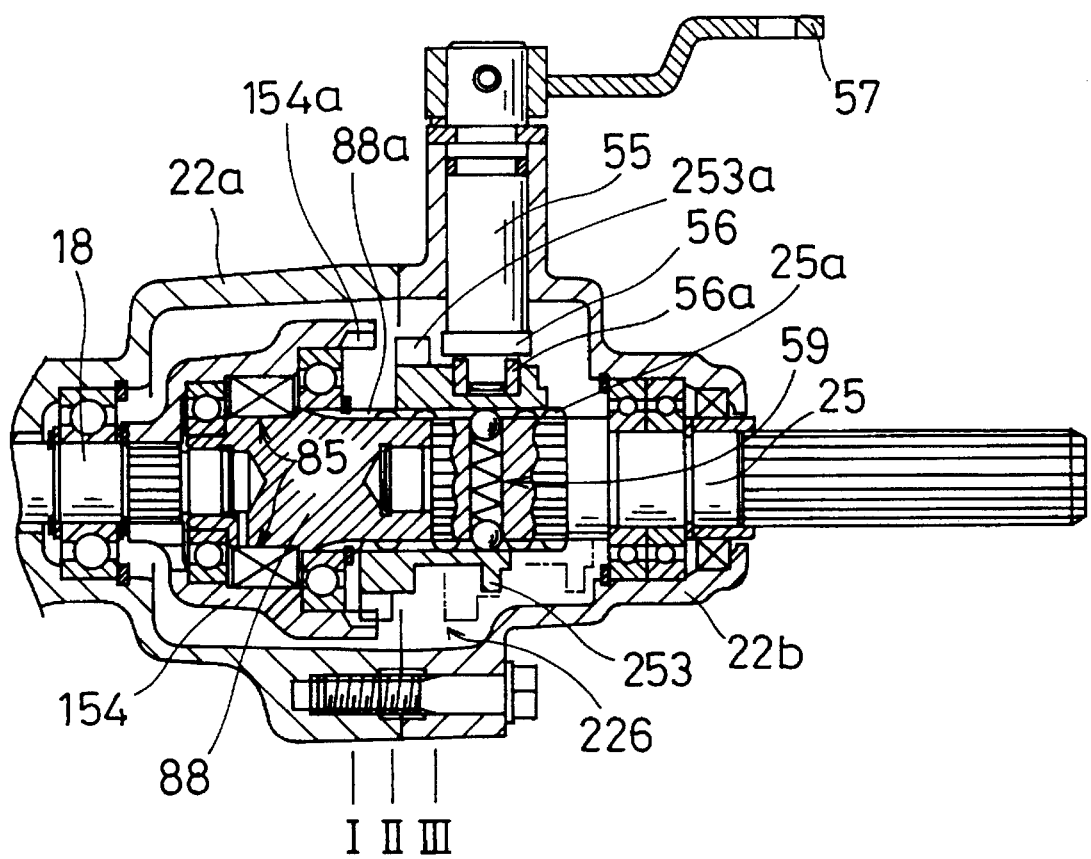
FIG. 13 is a sectional side view of a part of a third preferred embodiment of the transmission according to the present invention.

Referring now to FIG. 13, there is shown a third embodiment in which a front wheel-driving clutch mechanism 226 is employed for providing three drive modes for the front wheels. As shown in FIG. 13, an intermediate shaft 88 is disposed co-axially with and between the output shaft 18 and front wheel-drive shaft 25 and is supported rotatably by a hollow shaft 154 which is fixedly mounted on a front end portion of the output shaft 18. The hollow shaft 154 extends forwardly around the intermediate shaft 88 and includes, at its front end portion, internal teeth 154a. A movable clutch member 253 is slidably but non-rotatably mounted on the drive shaft 25. This clutch member 253 includes, at its rear end portion, external teeth 253a which are engageable with the teeth 154a. The clutch member 253, which is operated by a control mechanism similar to the one set forth before, is adapted to be moved to a first position I where teeth 253a are engaged with the teeth 154a as shown in FIG. 13 with respect to a lower half of this member, a second position II where the member 253 is engaged with both of splines 88a in the outer surface of the intermediate shaft 88 and splines 25a in the outer surface of the drive shaft 25 under the condition where teeth 253a are disengaged from the teeth 154a as shown in FIG. 13 with respect to an upper half of the member 253, and a third position III where the member 253 is placed only on the drive shaft 25 as shown in phantom in FIG. 13 with respect to the lower half of the member 253. A latching mechanism 59 similar to the one set forth before is provided such that it is operable to latch the movable clutch member 253 releaseably at each of these positions I, II and III. A one-way clutch 85, which is identical with the one employed in the second embodiment, is disposed between the hollow shaft 154 and the intermediate shaft 88.

At the first position I of the movable clutch member 253, the front wheel-drive shaft 25 is coupled to the hollow shaft 154 so that the drive shaft 25 is driven constantly by the output shaft 18 whereby a constant drive mode for front wheels is provided. At the second position II of the movable clutch member 253, the drive shaft 25 is coupled to the intermediate shaft 88 so as to rotate together with the latter shaft so that the one-way clutch 85 is engaged so as to transmit rotation from the output shaft 18 to the drive shaft 25 only when the forward-directional speed of rotation of the output shaft 18 and hollow shaft 154 is larger than that of the intermediate shaft 88 and drive shaft 25. At the third position III of the clutch member 253, the drive shaft 25 is disconnected from the intermediate shaft 88 so that the former shaft 25 is not driven from the side of output shaft 18. It is thus seen that the front wheel-driving clutch mechanism 226 shown in FIG. 13 will provide, in response to the positions I, II and III of the movable clutch member 253, a constant drive mode and selective drive mode for the front wheels, similar to those provided by the clutch mechanism 126 employed in the second embodiment, respectively at the first position I and at the second position II, and a non-drive mode for the front wheels at the third position III.

In a vehicle in which the third embodiment is employed, the position of the motor swash plate and the drive mode for the front wheels are generally selected based on the following standard, listed in TABLE 2, in accordance with the use of the vehicle.

TABLE 2

| Condition of Use | Position of Motor Swash Plate | Drive Mode for Front Wheels |
| --- | --- | --- |
| Traveling Condition on Road | High-Speed Position H | Non-Drive Mode |
| Light-Load Work Condition | Low-Speed Position L | Selective Drive Mode |
| Heavy-Load Work Condition | Low-Speed Position L | Constant Drive Mode |

As can be understood from the foregoing description, fuel cost is saved in the traveling condition on road shown in TABLE 2. In the light-load work condition shown in TABLE 2, saving in the fuel cost and turning of the vehicle with a small radius of turn are secured owing to the two-wheel drive of vehicle while an automatic four-wheel drive at a slipping condition of the rear wheels is attained so as to secure a stable traveling condition of the vehicle. In the heavy-load work condition shown in TABLE 2, a high tractive force required at that condition is secured.

Figure 14:
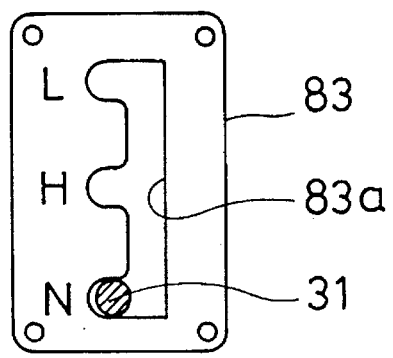
FIG. 14 is a plane view showing an example of a lever guide for a motor control lever shown in FIG. 10.

FIG. 14 illustrates an example of a lever guide 83 which can be used in conjunction with a motor control lever 31 shown in FIG. 10. The lever guide 83 shown includes a guide groove 83a having lever-locking recesses at three positions which correspond respectively to the neutral position N, high-speed position H and low-speed position L of the motor swash plate.

While preferred embodiment of the invention have been described, it will be appreciated that various modifications and changes may be made without departing from the spirit and scope of the appended claims.

We claim:

1. A drive transmission for working vehicles which includes a hydrostatic transmission (14) comprising:

an input shaft (17) driven by an engine (3);

a variable displacement pump (15) driven by said input shaft and having a first swash plate (28) which is adapted to be angularly displaced from its neutral position in one and the other directions in a non-stepwise manner;

a variable displacement motor (16) which is in fluid-connection with said pump so as to be driven by said pump, said motor having a second swash plate (29) which is adapted to be angularly displaced from its neutral position in one direction in a stepwise manner to plural angular positions, said first and second swash plates being adapted such that both of said swash plates can be placed in said neutral positions thereof at the same time; and an output shaft (18) driven by said motor, said output shaft including one end adapted to be connected drivingly to primary vehicle drive-wheels (2) and the other end adapted to be connected drivingly to auxiliary vehicle-drive wheels (1).

2. The drive transmission as set forth in claim 1, wherein said output shaft (18) is connected to said primary vehicle-drive wheels (2) through a mechanical transmission mechanism (21) so as to drive said primary drive wheels constantly and to said auxiliary vehicle-drive wheels (1) through a clutch (26; 126, 226) which permits a selective drive of said auxiliary drive wheels.

3. The drive transmission as set forth in claim 1, wherein a position-retaining mechanism (37) is provided which is operable to retain said second swash plate (29) releaseably at each of said neutral position and said plural angular positions.

4. The drive transmission as set forth in claim 1, wherein said first swash plate (28) is of a trunnion type which has at its one and the other sides a pair of support shafts (28a, 28b), while said second swash plate (29) is of a cradle type which is rockably supported by a stationary guide member (33).

5. The drive transmission as set forth in claim 1, wherein said first and second swash plates (28, 29) are connected to a single maneuvering member (130) which is operable to angularly displace said first swash plate (28) when said maneuvering member is operated in one direction while to angularly displace and second swash plate (29) when said maneuvering member is operated in another direction.

6. The drive transmission as set forth in claim 5, wherein said maneuvering member (130) is guided by a guide member (80) which permits a displacement of said first swash plate (28) from its neutral position only at each of said plural angular positions of said second swash plate (29).

7. A four wheel-drive transmission for working vehicles, which comprises:

a hydrostatic transmission (14) including an input shaft (17), a hydraulic pump (15) driven by said input shaft and having a first swash plate (28) which is adapted to be angularly displaced from its neutral position in one and the other directions in a non-stepwise manner, a hydraulic motor (16) being in fluid-connection with said hydraulic pump so as to be driven by said pump and having a second swash plate (29) which is adapted to be angularly displaced from its neutral position in one direction in a stepwise manner to plural angular positions, and an output shaft (18) driven by said hydraulic motor;

a mechanical transmission mechanism (21) which connects said output shaft (18) at its one end to a first pair of vehicle-drive wheels (2) such that said first pair of drive wheels are driven constantly; and a clutch mechanism (26; 126; 226) which connects said output shaft (18) at the other end thereof to a second pair of vehicle-drive wheels (1) so as to permit a selective drive of said second pair of drive wheels.

8. The four wheel-drive transmission as set forth in claim 7, wherein said first pair of drive wheels are a pair of rear wheels (2), and wherein said second pair of drive wheels are a pair of front wheels (1).

9. The four wheel-drive transmission as set forth in claim 7, wherein said mechanical transmission mechanism (21) is housed within a transmission casing (4) in which wheel axles (2a) of said first pair of drive wheels (2) are journalled, and wherein said hydraulic motor (16) and said clutch mechanism (26; 126; 226) are housed within a housing (22) which is mounted on said transmission casing (4) at an outer surface of said casing located on the side of said second pair of drive wheels (1).

10. The four wheel-drive transmission as set forth in claim 7, wherein said clutch mechanism (26) is shiftable to a state where power is transmitted constantly to said second pair of drive wheels (1), and to another state where transmission of power to said second pair of drive wheels (1) is cut off.

11. The four wheel-drive transmission as set forth in claim 10, wherein said second swash plate (29) is displaceable to a first angular position where said hydraulic motor (16) is driven at a high rotational speed, and to a second angular position where said hydraulic motor (16) is driven at a low rotational speed, and herein said clutch mechanism (26) includes a movable clutch member (53) which is operatively connected to said second swash plate (29) such that when said second swash plate is displaced to said first angular position said movable clutch member is moved so as to shift said clutch mechanism to said another state.

12. The four wheel-drive transmission as set forth in claim 7, wherein said clutch mechanism (126) includes:
  a movable clutch member (153) which is adapted to be moved to a first position where said second pair of drive wheels (1) are connected co-rotatably to said output shaft (18), and to a second position where said second pair of drive wheels (1) are disconnected from said output shaft (18), and
  a one-way clutch (85) which is engaged so as to connect said second pair of drive wheels (1) co-rotatably to said output shaft (18) when said one-way clutch is relatively driven forward-directionally by said output shaft as said second position of said movable clutch member (153).

13. The four wheel-drive transmission as set forth in claim 7, wherein said clutch mechanism (226) includes:
  a wheel-drive shaft (25) which is co-rotatably connected to said second pair of drive wheels (1);
  an intermediate shaft (88) which is disposed rotatably between said output shaft (18) and said wheel-drive shaft (25);
  a movable clutch member (253) which is adapted to be moved to a first position where said wheel-drive shaft (25) is coupled to said output shaft (18), a second position where said wheel-drive shaft (25) is coupled to said intermediate shaft (88), and third position where said wheel-drive shaft (25) is disconnected from both of said output shaft (18) and said intermediate shaft (88), and
  a one-way clutch (85) which is disposed between said output shaft (18) and said intermediate shaft (88) such that said one-way clutch is engaged so as to connect said intermediate shaft co-rotatably to said output shaft when said one-way clutch is driven forward-directionally by said output shaft relative to said intermediate shaft at said second position of said movable clutch member (253).

* * * * *

UNITED STATES PATENT AND TRADEMARK OFFICE
CERTIFICATE OF CORRECTION

PATENT NO. : 5,560,447
DATED : October 1, 1996
INVENTOR(S) : Norihiro Ishii et al.

It is certified that error appears in the above-indentified patent and that said Letters Patent is hereby corrected as shown below:

Claim 5, column 16, line 34, delete "and" and substitute therefor -- said --.

Claim 11, column 17, line 20, delete "herein" and substitute therefor -- wherein --.

Signed and Sealed this

Twenty-fourth Day of December, 1996

Attest:

BRUCE LEHMAN

*Attesting Officer*      *Commissioner of Patents and Trademarks*